(12) United States Patent
Sterling et al.

(10) Patent No.: US 6,375,851 B1
(45) Date of Patent: Apr. 23, 2002

(54) CONTINUOUS LIQUID PURIFICATION PROCESS

(75) Inventors: Julie G. Sterling, Pecatonica; Thomas K. Mallmann, Rockford; Ronald N. White, Roscoe; Brian D. Burris, Rockford; Steven M. Johnson, Belvidere, all of IL (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 09/565,334

(22) Filed: May 5, 2000

(51) Int. Cl.$^7$ .................................................. C02F 1/42
(52) U.S. Cl. ........................ 210/677; 210/681; 210/683
(58) Field of Search ............................. 210/670, 675, 210/677, 660, 681, 683, 678

(56) References Cited

U.S. PATENT DOCUMENTS

| | | |
|---|---|---|
| 2,815,332 A | 12/1957 | Higgins |
| 2,985,589 A | 5/1961 | Broughton |
| 3,642,616 A | 2/1972 | Burns |
| 4,522,726 A | 6/1985 | Berry |

OTHER PUBLICATIONS

Weiss, "ISEP Continuous Contractor for Continuous Ion Exchange", Ion Exchange Advances—Poceedings of IEX '92.
MacDonald, Thompson "Trials on Continuous Ion Exchange Decolorisation" Int. Sugar Jnl. 1997 vol. 99 No. 1181.

*Primary Examiner*—Chester T. Barry
(74) *Attorney, Agent, or Firm*—James R. Morgart

(57) ABSTRACT

The invention includes an operating method for the continuous purification of a liquid utilizing either single or dual ion exchange vessels, each vessel being physically divided into one or more discrete of ion exchange zones, each zone having an inlet and an outlet. A valving means at the inlet and outlet of each ion exchange zone provides communication between adjacent ion exchange zones as well as to feed, product, water and regenerant chemical streams. In one aspect of this invention a first vessel contains a discrete plurality of cation exchange zones and a second vessel contains a discrete plurality of anion exchange zones. In another aspect of this invention, a single vessel contains a plurality of discrete cation exchange zones and a plurality of discrete anion exchange zones. In another aspect of the invention, each ion exchange zone is contained within a single vessel.

21 Claims, 15 Drawing Sheets

Dual Pass Service

Single Pass Service

Dual Pass Service with Recirculating Rinse

Dual Pass Sweeten On / Off

Single Column Operation with Backwash

| Step No. | Description | Common Header Valves Open | Ion Exchange Zone Valves Open |
|---|---|---|---|
| 1 | Regenerant Chemical | K,N | G1, D4, H4, H5, H6, C6 |
|   | Service |   | A2, H2, F3 |
| 2 | Regenerant Rinse | K,N | G1, D4, H4, H5, H6 |
|   | Service |   | A2, H2, F3 |
| 3 | Backwash | K,N | G4, H4, H5, D6 |
|   | Service |   | A2, H2, F3 |
| 4 | Standby |   |   |
|   | Service |   | A2, H2, F3 |

Figure 10

Dual Pass Service with Recirculating Rinse

| Step No. | Description | Common Cation Header Valves Open | Cation Ion Exchange Zone Valves Open | Common Anion Header Valves Open | Anion Ion Exchange Zone Valves Open |
|---|---|---|---|---|---|
| 1 | Sweeten Off 1 | N,J | D1, F1, B3, G3 | K,L | A1, F1, D3, G3 |
|   | Sweeten On 1 |     | A2, E2         |     | B2, E2 |
| 2 | Sweeten Off 2 | N,J | D1, F1, B3, G3 | L,J | A1, F1, D3, G3 |
|   | Sweeten On 1 |     | A2, E2         |     | B2, E2 |
| 3 | Header Flush | J,N,O |              | J,L | D1, G1 |
|   | Dual Pass Service |  | A2, F2, B3, E3 |    | A2, F2, B3, E3 |
| 4 | Sweeten Off 3 | J,N | D1, G1         | J,L | D1, G1 |
|   | Dual Pass Service |  | A2, F2, B3, E3 |    | A2, F2, B3, E3 |
| 5 | Header Flush |    |                | J,N,O |  |
|   | Dual Pass Service |  | A2, F2, B3, E3 |    | A2, F2, B3, E3 |
| 6 | Regenerant Chemical | K,N | G1, D4, H4, H5, H6, C6 | K,N | G1, D4, H4, H5, H6, C6 |
|   | Service |     | A2, F2, B3, E3 |     | A2, F2, B3, E3 |
| 7 | Regenerant Rinse | K,N | G1, D4, H4, H5, H6 | K,N | G1, D4, H4, H5, H6 |
|   | Service |     | A2, F2, B3, E3 |     | A2, F2, B3, E3 |
| 8 | Backwash | K,N | G4, H4, H5, D6 | K,N | G4, H4, H5, D6 |
|   | Service |     | A2, F2, B3, E3 |     | A2, F2, B3, E3 |
| 9 | Header Flush | K,N,O |            | K,N,O |  |
|   | Service |     | A2, F2, B3, E3 |     | A2, F2, B3, E3 |
| 10 | Recirculating Rinse | I,M,N | D4,G4 | I,M | D4,G4 |
|    | Service |     | A2, F2, B3, E3 |     | A2, F2, B3, E3 |
| 11 | Standby |     |                |     |  |
|    | Service |     | A2, F2, B3, E3 |     | A2, F2, B3, E3 |

Figure 11

Single Pass Service with Recirculating Rinse

| Step No. | Description | Common Cation Header Valves Open | Cation Ion Exchange Zone Valves Open | Common Anion Header Valves Open | Anion Ion Exchange Zone Valves Open |
|---|---|---|---|---|---|
| 1 | Sweeten Off 1 | J,N | D1, F1 | L | A1, H1, F2 |
|   | Sweeten On 1 |  | A2, H2, G3 | K | D3, G3 |
| 2 | Sweeten Off 1 | J,N | D1, G1 | L | D1, H1, F2 |
|   | Sweeten On 2 |  | A2, H2, F3 | J | A3, G3 |
| 3 | Header Flush | J,N,O |  | J,L | D1, G1 |
|   | Single Pass Service |  | A2, H2, F3 |  | A2, H2, F3 |
| 4 | Sweeten Off 2 | J,N | D1, G1 | J,L | D1, G1 |
|   | Single Pass Service |  | A2, H2, F3 |  | A2, H2, F3 |
| 5 | Header Flush |  |  | J,N,O |  |
|   | Single Pass Service |  | A2, H2, F3 |  | A2, H2, F3 |
| 6 | Regenerant Chemical | K,N | G1, D4, H4, H5, H6, C6 | K,N | G1, D4, H4, H5, H6, C6 |
|   | Service |  | A2, H2, F3 |  | A2, H2, F3 |
| 7 | Regenerant Rinse | K,N | G1, D4, H4, H5, H6 | K,N | G1, D4, H4, H5, H6 |
|   | Service |  | A2, H2, F3 |  | A2, H2, F3 |
| 8 | Backwash | K,N | G4, H4, H5, D6 | K,N | G4, H4, H5, D6 |
|   | Service |  | A2, H2, F3 |  | A2, H2, F3 |
| 9 | Header Flush | K,N,O |  | K,N,O |  |
|   | Service |  | A2, H2, F3 |  | A2, H2, F3 |
| 10 | Recirculating Rinse | I,M,N | D4,G4 | I,M | D4,G4 |
|    | Service |  | A2, H2, F3 |  | A2, H2, F3 |
| 11 | Standby |  |  |  |  |
|    | Service |  | A2, H2, F3 |  | A2, H2, F3 |

Figure 12

Dual Pass Service with Recirculating Rinse and Cation Cross-Regeneration

| Step No. | Description | Common Cation Header Valves Open | Cation Ion Exchange Zone Valves Open | Common Anion Header Valves Open | Anion Ion Exchange Zone Valves Open |
|---|---|---|---|---|---|
| 1 | Sweeten Off 1 | J,N | D1, F1, B3, G3 | K,L | A1, F1, D3, G3 |
|   | Sweeten On 1 |   | A2, E2 |   | B2, E2 |
| 2 | Sweeten Off 2 | J,N | D1, F1, B3, G3 | J,L | A1, F1, D3, G3 |
|   | Sweeten On 1 |   | A2, E2 |   | B2, E2 |
| 3 | Header Flush | J,N,O |   | J,L | D1, G1 |
|   | Dual Pass Service |   | A2, F2, B3, E3 |   | A2, F2, B3, E3 |
| 4 | Sweeten Off 3 | J,N | D1, G1 | J,L | D1, G1 |
|   | Dual Pass Service |   | A2, F2, B3, E3 |   | A2, F2, B3, E3 |
| 5 | Header Flush |   |   | J,N,O |   |
|   | Dual Pass Service |   | A2, F2, B3, E3 |   | A2, F2, B3, E3 |
| 6 | Cross Regen. - NaOH in | K, M | G6, D6 | I, N | G5, H5, C6, D6 |
|   | Service |   | A2, F2, B3, E3 |   | A2, F2, B3, E3 |
| 7 | Header Flush | K,M,O |   | I,O,N |   |
|   | Service |   | A2, F2, B3, E3 |   | A2, F2, B3, E3 |
| 8 | Cross Regen. - Rinse | K, M | G6, D6 | I, N | G5, H5, D6 |
|   | Service |   | A2, F2, B3, E3 |   | A2, F2, B3, E3 |
| 9 | Cross Regen - HCL In | K, N | D4, H4, H5, G6, C6 |   |   |
|   | Service |   | A2, F2, B3, E3 |   | A2, F2, B3, E3 |
| 10 | Regenerant Chemical | K,N | G1, D4, H4, H5, H6, C6 | K,N | G1, D4, H4, H5, H6, C6 |
|   | Service |   | A2, F2, B3, E3 |   | A2, F2, B3, E3 |
| 11 | Regenerant Rinse | K,N | G1, D4, H4, H5, H6 | K,N | G1, D4, H4, H5, H6 |
|   | Service |   | A2, F2, B3, E3 |   | A2, F2, B3, E3 |
| 12 | Backwash | K,N | G4, H4, H5, D6 | K,N | G4, H4, H5, D6 |
|   | Service |   | A2, F2, B3, E3 |   | A2, F2, B3, E3 |
| 13 | Header Flush | K,N,O |   | K,N,O |   |
|   | Service |   | A2, F2, B3, E3 |   | A2, F2, B3, E3 |
| 14 | Recirculating Rinse | I,M,N | D4,G4 | I,M | D4,G4 |
|   | Service |   | A2, F2, B3, E3 |   | A2, F2, B3, E3 |
| 15 | Standby |   |   |   |   |
|   | Service |   | A2, F2, B3, E3 |   | A2, F2, B3, E3 |

Figure 13

Product Comparison

Conditions:
Temperature: 110° F
Throughput: 1100 lbs DS/ft³

| Constituent | Feed | Conventional Dual Pass IX Product | Single Pass Invention Product | Double Pass Invention Product |
|---|---|---|---|---|
| %DS | 32.0 | 30.7 | 31.5 | 32.4 |
| pH | 4.56 | 4.49 | 8.09 | 5.69 |
| Conductivity micromhos/cm | 238.2 | 5.2 | 12.9 | 1.4 |
| ICUMSA₄ Color | 48.5 | 7.1 | 4.5 | 1.1 |
| ICUMSA₄ Heat Color | 67.3 | 15.7 | 14.6 | 6.6 |
| HMF, ppm | - | 1.4 | 0.5 | 0.6 |
| Protein ppm as N | 313.3 | 102.7 | 89.3 | 122.8 |
| Lactic Acid ppm as such | 138.8 | <0.1 | <0.1 | <0.1 |
| Formic Acid ppm as such | 3.7 | 2.4 | 2.0 | 1.2 |

Figure 14

Pressure Drop Comparison

Conditions:
Feed Dry Solids: 30.6%
Temperature: 110° F

| Flow Rate gpm/ft$^2$ | $\triangle$P Cation Resin, psi/ft | $\triangle$P Anion Resin, psi/ft |
|---|---|---|
| 2 | 0.4 | 0.4 |
| 3 | 0.4 | 0.5 |
| 4 | 0.8 | 0.8 |
| 5 | 1.2 | 1.2 |
| 6 | 1.5 | 1.5 |
| 7 | 1.9 | 1.8 |
| 8 | 2.3 | 2.1 |

Figure 15

CONTINUOUS LIQUID PURIFICATION PROCESS

BACKGROUND OF THE INVENTION

1. Field of the Invention

This invention relates to a process for the continuous purification of a liquid using ion exchange resins. In one aspect, this invention relates to the continuous purification of sugar syrups produced in the corn wet-milling industry.

2. Background Information

U.S Pat. No. 2,815,322 describes a method for continuous liquid purification utilizing a moving bed ion exchange system. In this method, an ion exchange resin is physically moved from an exhaustion zone to a regeneration zone in a continuous loop contactor.

U.S Pat. No. 2,985,589 describes a simulated moving bed purification system utilizing a chromatographic separation to separate two or more components from each other.

U.S Pat. No. 3,642,616 describes a continuous purification system utilizing a series of ion exchange vessels to provide soft water.

U.S. Pat. No. 4,522,726 discloses a series of ion exchange compartments mounted on a rotatable carousel with the inlets and outlets of the compartments connected to central rotating multiport valves.

The corn wet-milling industry commonly utilizes pairs of ion exchange vessels, connected in series, to provide a means of purifying various sugar syrups, including, but not limited to corn syrup, dextrose and fructose. The syrups can have varying degrees of impurities at different concentrations depending on where the syrup is in the wet-milling process. A pair of vessels, one containing cation exchange resin and one containing anion exchange resin are operated in series to provide a primary ion exchange system. The effluent from this pair is then fed to an identical pair of cation-anion vessels to provide a secondary, or polishing, ion exchange zone. A third pair of identical cation-anion vessels is kept off-line while they are being regenerated with acid and caustic solutions, respectively. Regeneration is completed by first sweetening-off the exhausted beds to displace the syrup. The first portion of the sweeten-off volume is sent forward as product. After a set volume is sent forward to product, the remaining volume is collected in a sweetwater surge tank. This large sweetwater volume is evaporated and then sent back to feed. Sweeten-off is followed by backwashing of the resins to remove fines. The resin beds are then eluted with dilute acid or caustic and rinsed with water to remove excess chemical. After rinse, the resin beds are put in stand-by until the next cycle begins. The resins can be in stand-by up to 75% of the service cycle time. When the primary pair becomes exhausted, they are taken off-line to be regenerated as outlined above. The pair, which was previously in the secondary, or polishing, position, now becomes the primary set of ion exchangers. The pair that has just been regenerated now is put into service at the secondary, or polishing, position. Before the freshly regenerated resin beds are placed in service, they are sweetened-on. In sweetening on, a first set volume of effluent is sent to drain. A second set volume is then sent to the sweetwater surge tank before the resin beds are ready to be placed in the secondary position. As is the case during sweetening-off, the collected sweeten-on sweetwater is evaporated and sent back to feed. The switching from primary to secondary to polishing positions is done by opening and closing a series of valves on inlet and outlet manifolds to the ion exchangers.

This method of operating assures that the most freshly regenerated resin bed will be in the polishing position, assuring the highest quality of purified product. It also assures that the primary set of exchangers will be utilized to the maximum extent possible, thus maximizing the overall economics of the process. Typically, as the ion exchange resins age they require a longer rinse volume due to a gradual buildup of foulants, which inhibit the rinse kinetics. To reduce the rinse volume on these aged resins, a recirculation rinse mode can be employed during the regeneration rinse which directs the anion rinse stream, through a pump, and back into the cation and again through the anion. A cross regeneration mode may also be employed to remove proteinaceous materials from the resin beds. Cross regeneration is the method of applying an anion regenerant to a cation exchanger or a cation regenerant to an anion exchanger. This is then followed by a standard regeneration using dilute acid on the cation resin and dilute caustic on the anion resin using dosages to ensure complete conversion. Periodic cross regeneration of the cation exchanger with caustic soda, in a corn syrup demineralization application, is common in order to remove proteinaceous material from the resin. These six-bed ion exchange systems generally employ resin bed depths of about 8 feet and are typically run at linear flow rates of about 2 gallons per minute per square foot of pressure vessel area. Higher flows are limited by resin pressure drop in the deep beds. Because the ion exchange resin is not being moved through a series of vessels, resin attrition is kept to a minimum. Maintenance and downtime are minimized through the use of discrete valves as opposed to utilizing multiport valves. Although common in the industry, six-bed ion exchange systems have a number of drawbacks, including:

1. The systems have a large footprint, taking up large amounts of plant space.
2. The relatively deep resin beds require running at reduced flow rates due to pressure drop limitations of the resin bed.
3. They have intermittent, high flow regenerant discharges to waste, which usually require high-capacity surge tanks.
4. They require high-capacity sweetwater storage tanks, which are used to contain the low concentration sugar solutions, which are produced when rinsing the resins prior to regeneration and when pumping the feed syrup into a freshly regenerated ion exchanger.
5. The large amounts of sweetwater cause an intermittent flow of purified product, necessitating more surge/storage tanks for the product.
6. Relatively high backwash flow rates, rinse volumes and regenerant chemical dosages are required.
7. Large inventories of ion exchange resins, relative to the amount of product produced, are required.

INTRODUCTION TO THE INVENTION

There is a need for a liquid purification system which would have a smaller footprint, less ion exchange resin inventory, lower sweetwater volumes, more constant waste flow rates and relatively constant product flow rate, as compared to conventional purification systems. Such a liquid purification system would have lower regenerant flow rates, be operable at higher linear velocity flow rates without causing any adverse effects on product quality or causing any undue pressure drop across the ion exchange resin bed.

It is an object of the invention to provide a liquid purification system with a smaller footprint than a conventional liquid purification system of similar capacity.

It is a further object of the invention to provide a liquid purification system, which has a reduced volume and more constant wastewater flow rate than a conventional liquid purification system of similar capacity.

It is still a further object of the invention to provide a liquid purification system, which has less ion exchange resin inventory than a conventional liquid purification system of similar capacity.

It is still a further object of the invention to provide a liquid purification system with a more consistent product flow rate than a conventional liquid purification system of similar capacity.

It is still a further object of the invention to provide a liquid purification system which operates at a higher linear velocity flow rate than a conventional liquid purification system without causing degradation of product quality or undue stress to the resin bed due to excessive pressure drop.

It is still a further object of the invention to provide a liquid purification system, which has lower water requirements and higher chemical efficiencies than conventional liquid purification systems of similar capacity without any adverse effects on product quality.

It is yet a further object of the invention to provide a means to recirculate the rinse water as necessitated by resin aging.

It is a further object of the invention to provide a means to cross-regenerate the ion exchange resin in order to remove proteinaceous foulants.

These and other objects of the invention will be fully understood from the following detailed description of the invention and from the drawings appended to this application.

The method of the present invention has met the above needs.

SUMMARY OF THE INVENTION

The invention includes an operating method for the continuous purification of a liquid utilizing either single or dual ion exchange vessels, each vessel being physically divided into a discrete plurality of ion exchange zones, each zone having an inlet and an outlet. A valving means at the inlet and outlet of each ion exchange zone provides communication between adjacent ion exchange zones as well as to feed, product, sweetwater, rinse, recirculation rinse and regenerant chemical streams. In one aspect of this invention a first vessel contains a discrete plurality of cation exchange zones and a second vessel contains a discrete plurality of anion exchange zones. In another aspect of this invention, a single vessel contains a plurality of discrete cation ion exchange zones and a plurality of discrete anion ion exchange zones. In yet another aspect of this invention, a single ion exchange zone is contained in a single vessel with a plurality of discrete vessels comprising the ion exchange system.

BRIEF DESCRIPTION OF THE DRAWINGS

FIG. 10 depicts single column operation just after an ion exchange zone advance has occurred.

FIG. 11 illustrates the valves utilizing recirculation rinse.

FIG. 12 depicts single pass mode operation just after an ion exchange zone advance has occurred.

FIG. 13 illustrates one method of cross regeneration.

FIG. 14 summarizes a product comparison.

FIG. 15 presents results of pressure drop studies.

DESCRIPTION OF A PREFERRED EMBODIMENT

Figure 1:
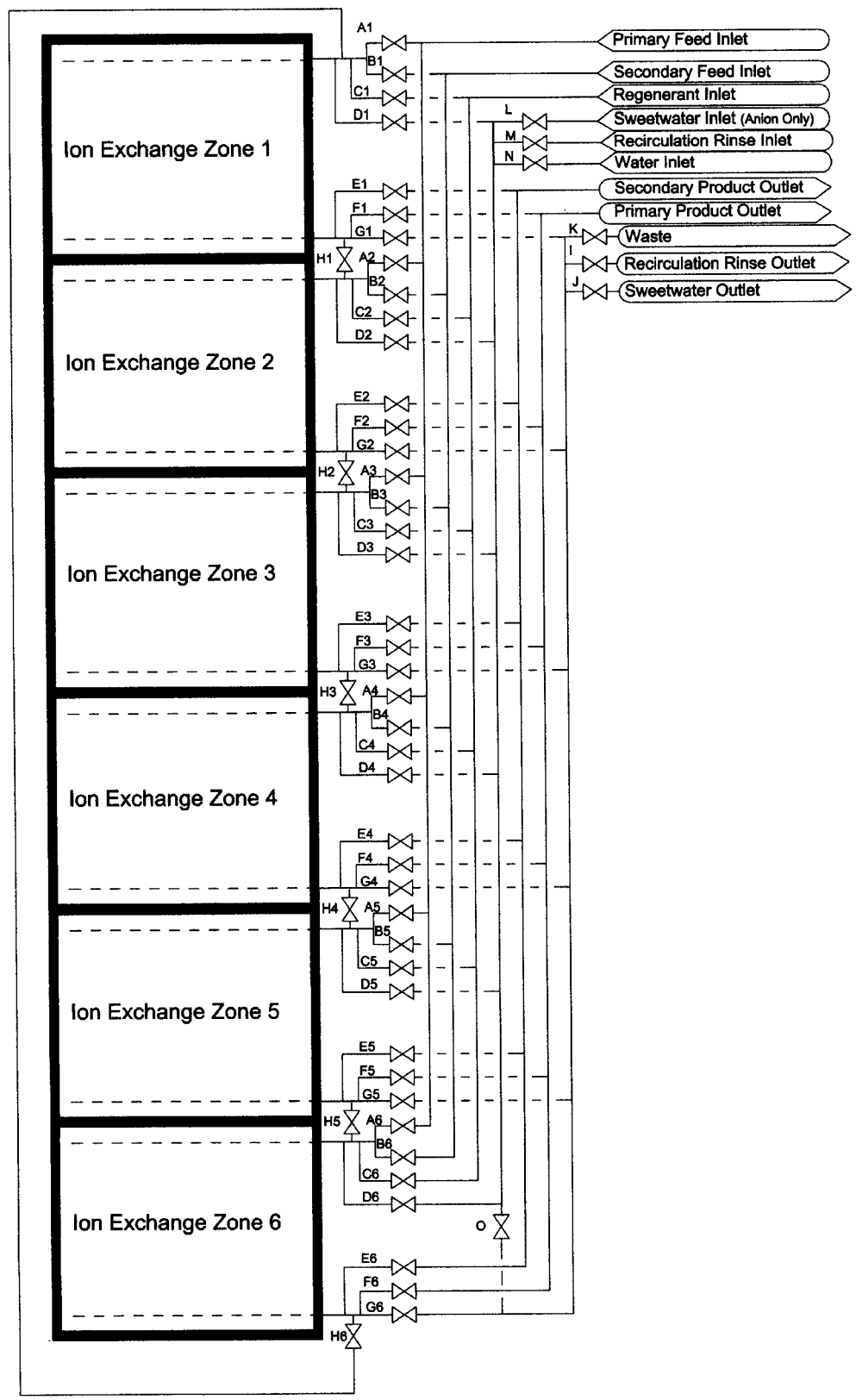
FIG. 1 is a diagram of a six ion exchange zone system illustrating the manifold and valving arrangement. Each ion exchange zone would contain either cation resin or anion resin. An identically arranged second system would contain the opposite ion exchange resin.

Referring now to FIG. 1, the six substantially cylindrical ion exchange zones contain a bed depth of approximately 36 inches of cation exchange resin, with about 12 inches of freeboard to allow for expansion during backwash. An identically arranged system containing anion exchange resin is connected to the primary and secondary cation exchange outlets. The recirculation rinse outlet of the cation exchange system is connected to the recirculation rinse inlet of the anion exchange system and the recirculation rinse outlet of the anion exchange system is connected through a pumping means to the recirculation rinse inlet of the cation exchange system. The dissimilar volumetric capacities typical between cation exchange resins and anion exchange resins are compensated for by selecting different diameters for each of the ion exchange systems.

Figure 2:
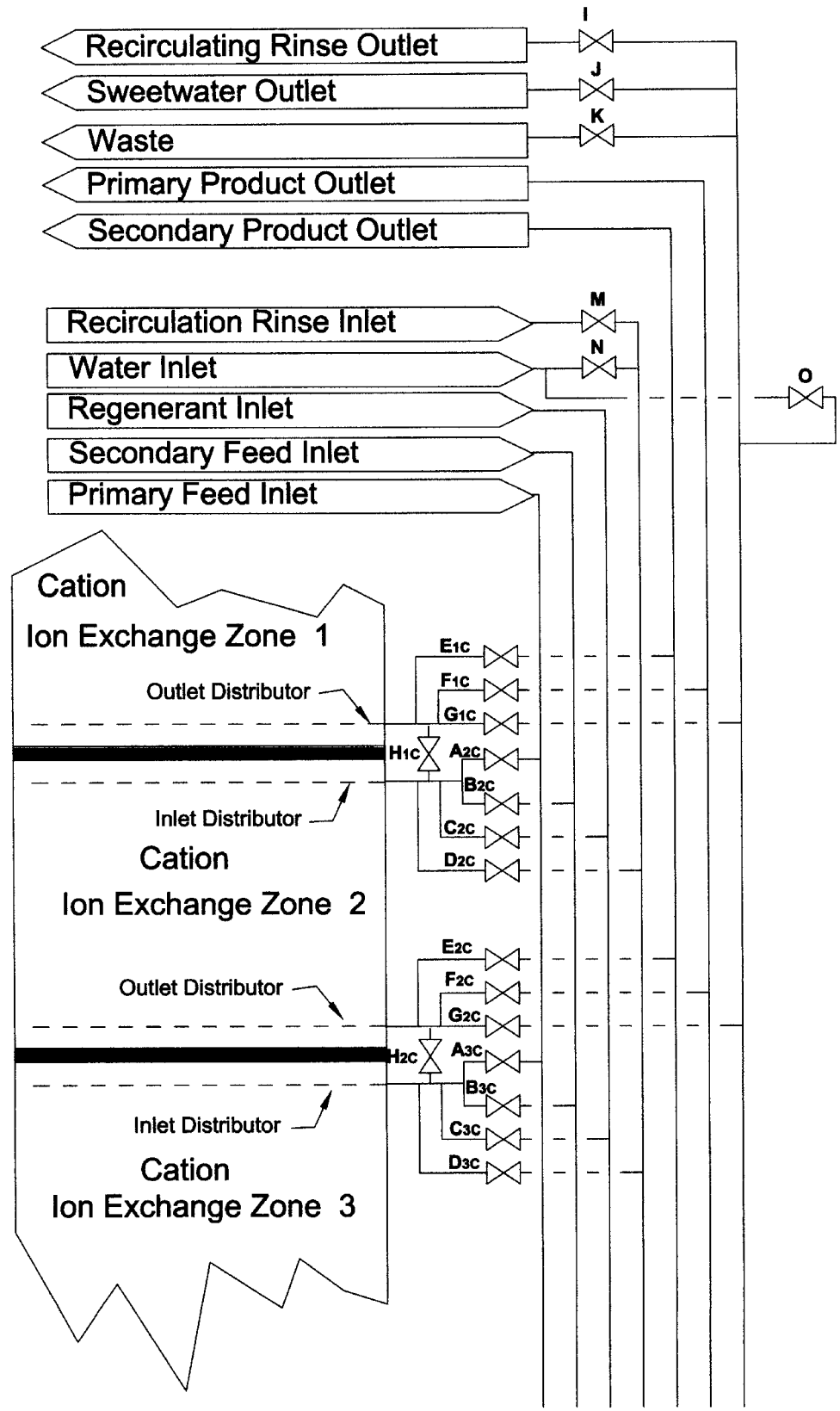
FIG. 2 is a partial cutaway view in cross section of a vessel showing one complete compartment and the valving means as well as the inlet and outlet distributor for the complete compartment and partial adjacent compartments.

Referring now to FIG. 2, a diagram of a cation exchange zone, in partial cross-section, is illustrated diagramming the valve arrangement, stream connections and inlet and outlet distributors. Portions of the adjacent compartments are shown for clarity. This figure represents a single cation exchange zone, with enough valves and streams to allow for a dual pass configuration. All other ion exchange zones would be of identical configuration, with a second vessel containing anion ion exchange resin also of an identical configuration. A single pass mode of operation would eliminate the need for the secondary feed and product headers and their associated valves. The outlet distributors are typically of the header-lateral type and are screened to prevent the loss of resin. The inlet distributors are typically be of the header-lateral type and are not screened, to allow backwash of dirt or broken resin particles. All flows with the exception of the backwash flow are in a downward direction from the inlet distributor to the outlet distributor. Although a compartmented vessel is shown in this embodiment, the method of present invention is also capable of operating in individual vessels with one ion exchange zone per vessel. The method of the present invention is also capable of operating with more than six ion exchange zones. A similar complimentary system contains the opposite resin. Valves with the prefix label "A" represent primary feed inlet valves and are connected to the primary inlet manifold. Valves with the prefix label "B" represent secondary feed inlet valves and are connected to the secondary feed inlet manifold. Valves prefix labeled "C" represent concentrated regenerant chemical inlet valves and are connected to the regenerant inlet manifold. Valves prefix labeled "D" are water inlet valves and may connect to either the sweetwater inlet manifold (anion only), the recirculation rinse inlet manifold or the water inlet manifold through valves "L", "M" or "N", respectively. Valves labeled "E" are secondary product outlet valves and connect to the secondary product outlet manifold. Valves prefix labeled "F" represent primary product outlet valves and are connected to the primary product outlet manifold. Valves prefix labeled "G" are rinse outlet valves and may be connected to either the recirculating rinse manifold, the sweetwater outlet manifold or the drain through valves "I", "J", or "K" respectively. Valves prefix labeled "H" are used to supply water being rinsed from an ion exchange zone to dilute the concentrated regenerant just before it passes into the succeeding ion exchange zone. Valves prefix labeled "H" are also used to allow liquid to pass from one ion exchange zone to the next in rinsing operations and in single pass deionization operations. The valve labeled "O" is used to introduce water into the recirculating rinse manifold and flush it to waste in order to prevent any accumulated regenerant waste from prematurely exhausting the resin during a recirculating rinse step.

Figure 9:
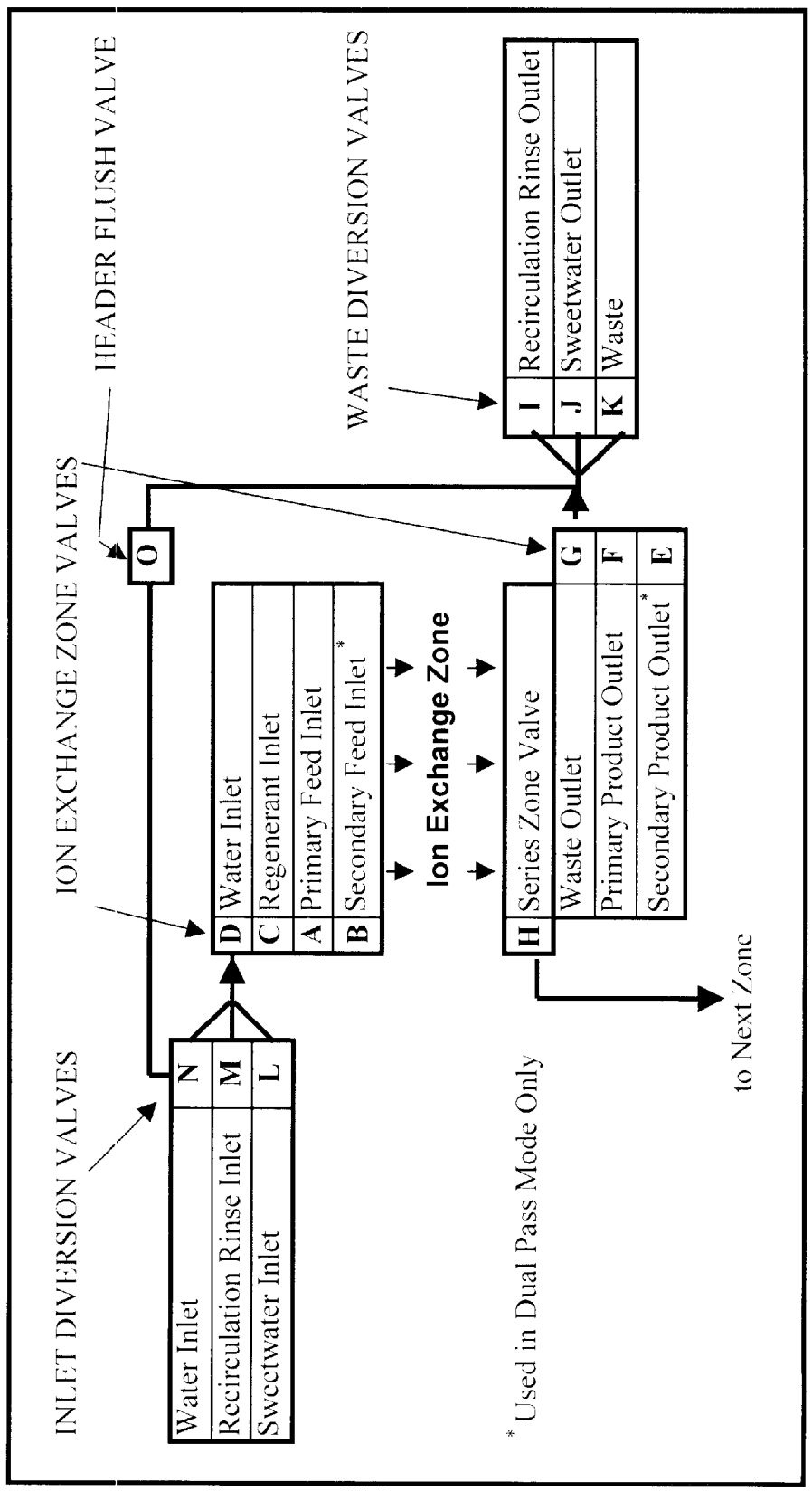
FIG. 9 summarizes the valve nomenclature.

The suffix of the valve labels represents the number of the ion exchange zone and the type of ion exchange zone. For example, Valve E2C represents the secondary product outlet for cation ion exchange zone number 2. FIG. 9 summarizes the valve nomenclature.

Figure 3:
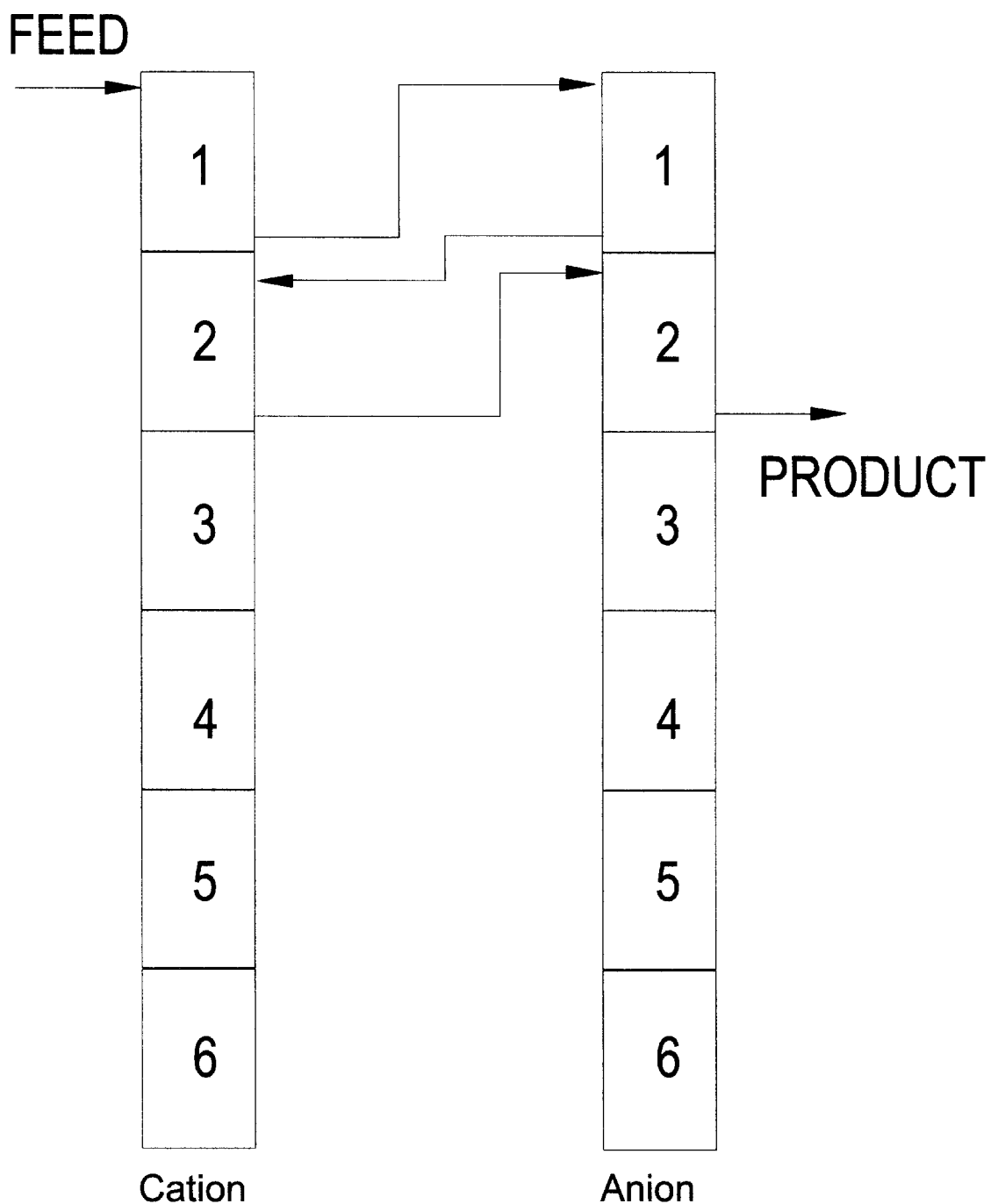
FIG. 3 is a diagram of a dual vessel, dual pass system illustrating a service cycle with two cation and two anion exchange zones in service. The other ion exchange zones would be undergoing regeneration steps as shown in FIG. 5.

A simplified diagram outlining the basic configuration of the invention can be found in FIG. 3, without the manifolds and valves shown.

Figure 4:
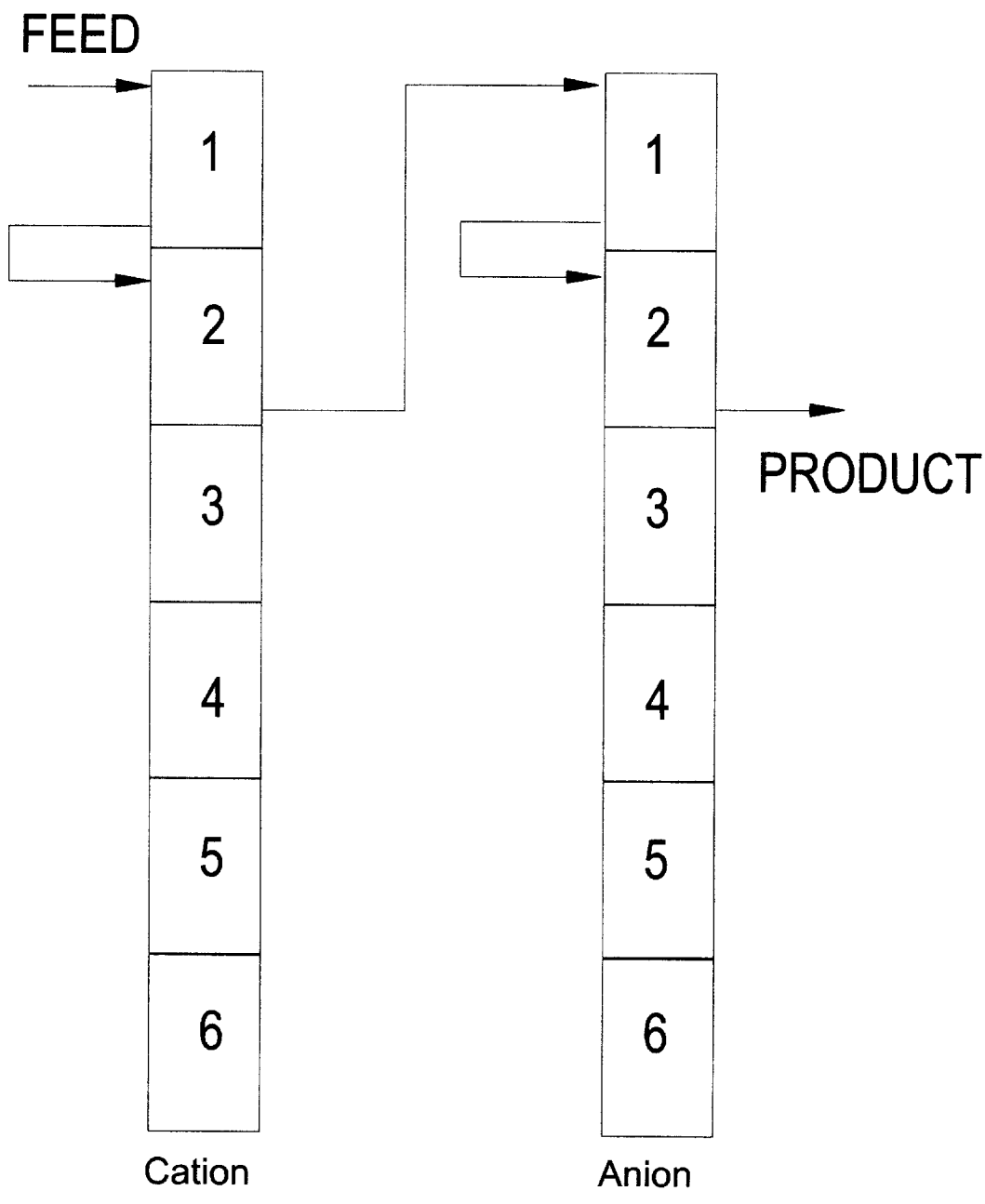
FIG. 4 is a diagram of a dual vessel, single pass system illustrating a service cycle with two cation and two anion exchange zones. The other ion exchange zones would be undergoing regeneration steps as shown in FIG. 5.

FIG. 4 illustrates a diagram of the basic configuration, only set up for a single pass service utilizing two cation ion exchange sections in series for one pass through the cation resin and two anion ion exchange sections in series for one pass through the anion exchange resin.

Figure 5:
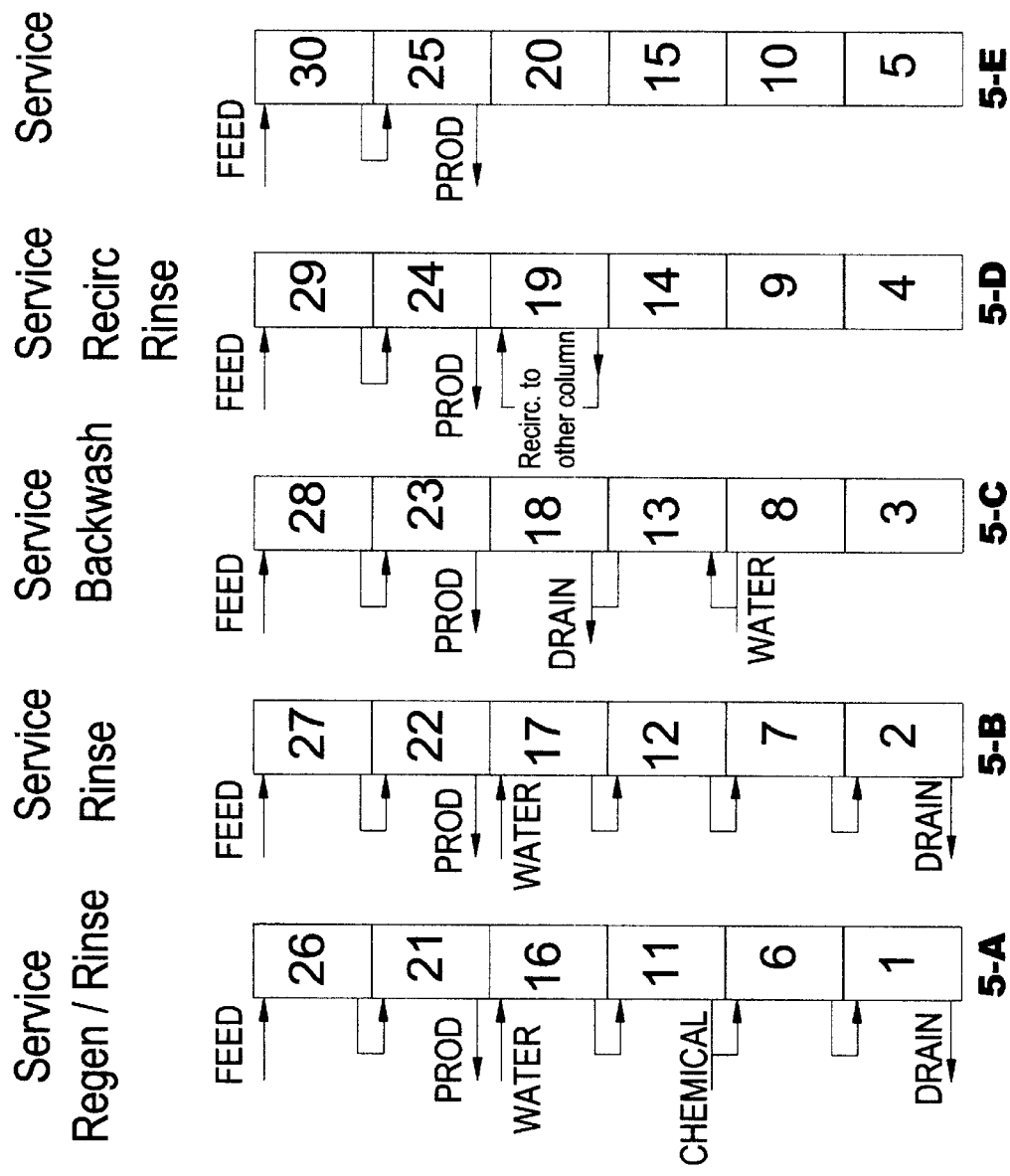
FIG. 5 is a diagram of a single vessel, divided into six discrete compartments of either cation exchange resin or anion exchange resin, illustrating a complete service-regeneration cycle of 30 steps, excluding sweeten on and sweeten off. A second vessel, not shown, would be undergoing identical steps with the opposite ion exchange resin

FIG. 5 illustrates the complete service and regeneration sequence for a single, six-compartment vessel containing either cation or anion exchange resin, including regeneration with spent chemical, regeneration with fresh chemical, rinses, backwash, recirculation rinse, and primary and secondary service. A second vessel containing the opposite ion exchange resin would normally be undergoing similar steps simultaneously.

Figure 6:
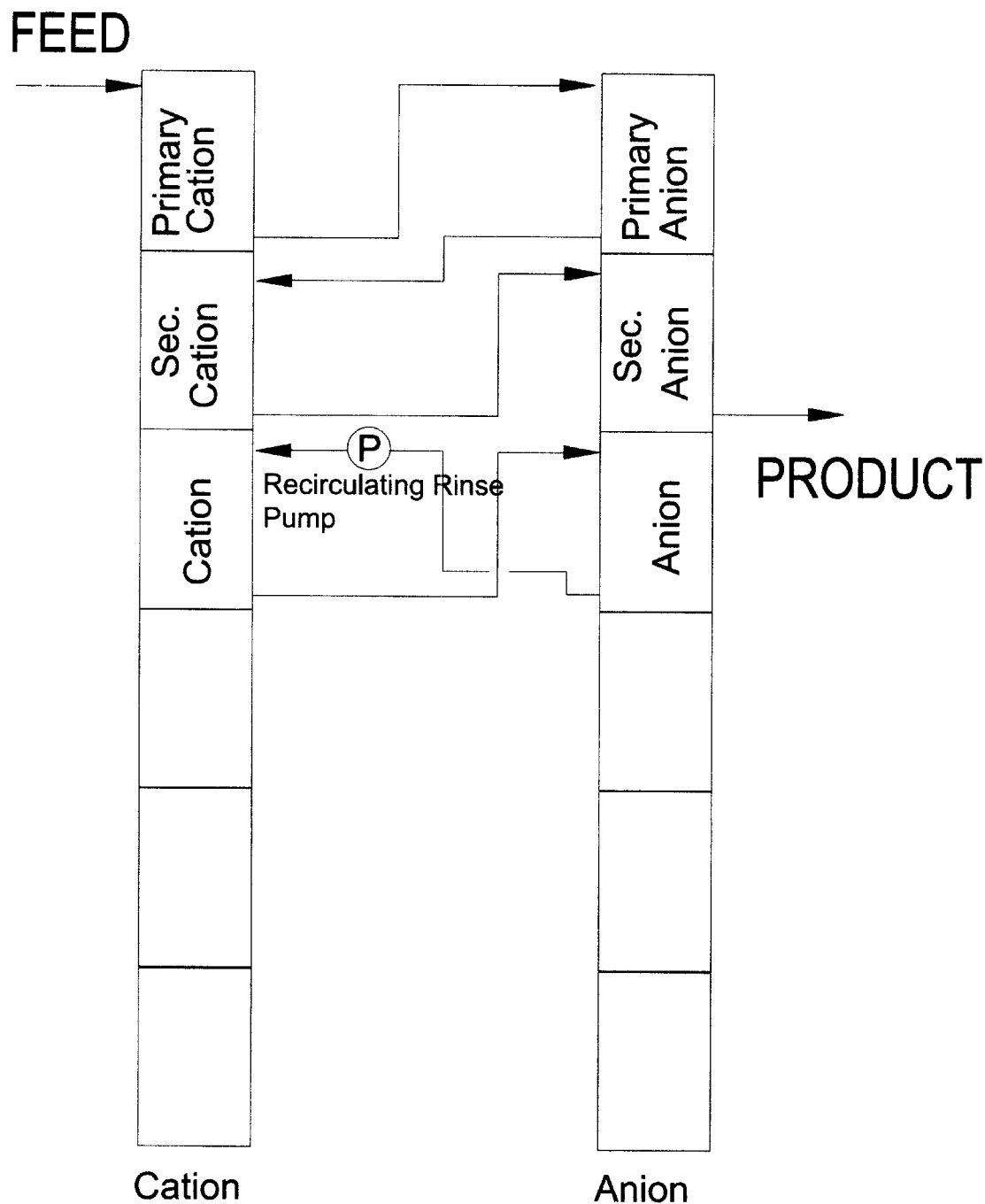
FIG. 6 is a diagram of a dual vessel, dual pass system illustrating a service cycle and a recirculating rinse step. This recirculation step is similar in a single pass system.

FIG. 6 demonstrates a two pass service mode with one six-compartment cation vessel and one six-compartment anion vessel utilizing recirculation final rinse to conserve rinse water and minimize waste on the pair of ion exchange zones which have just been regenerated. The regeneration sequence remains the same as in FIG. 5.

In the preferred embodiment of the invention, there are six ion exchange zones and six "zone advances" per cycle. The number of zone advances equals the number of ion exchange zones. For the purpose of describing the invention, a zone advance occurs when the feed and product streams shift down one ion exchange zone to a more freshly regenerated ion exchange zone. After shifting down to the last ion exchange zone, the next ion exchange zone advance will cycle around to the first ion exchange zone. Within each ion exchange zone advance there are several steps. The duration of these steps is dependent on the process performed.

Referring now to FIG. 3, the preferred embodiment of the invention comprises six cation exchange zones and six anion exchange zones.

Figure 7:
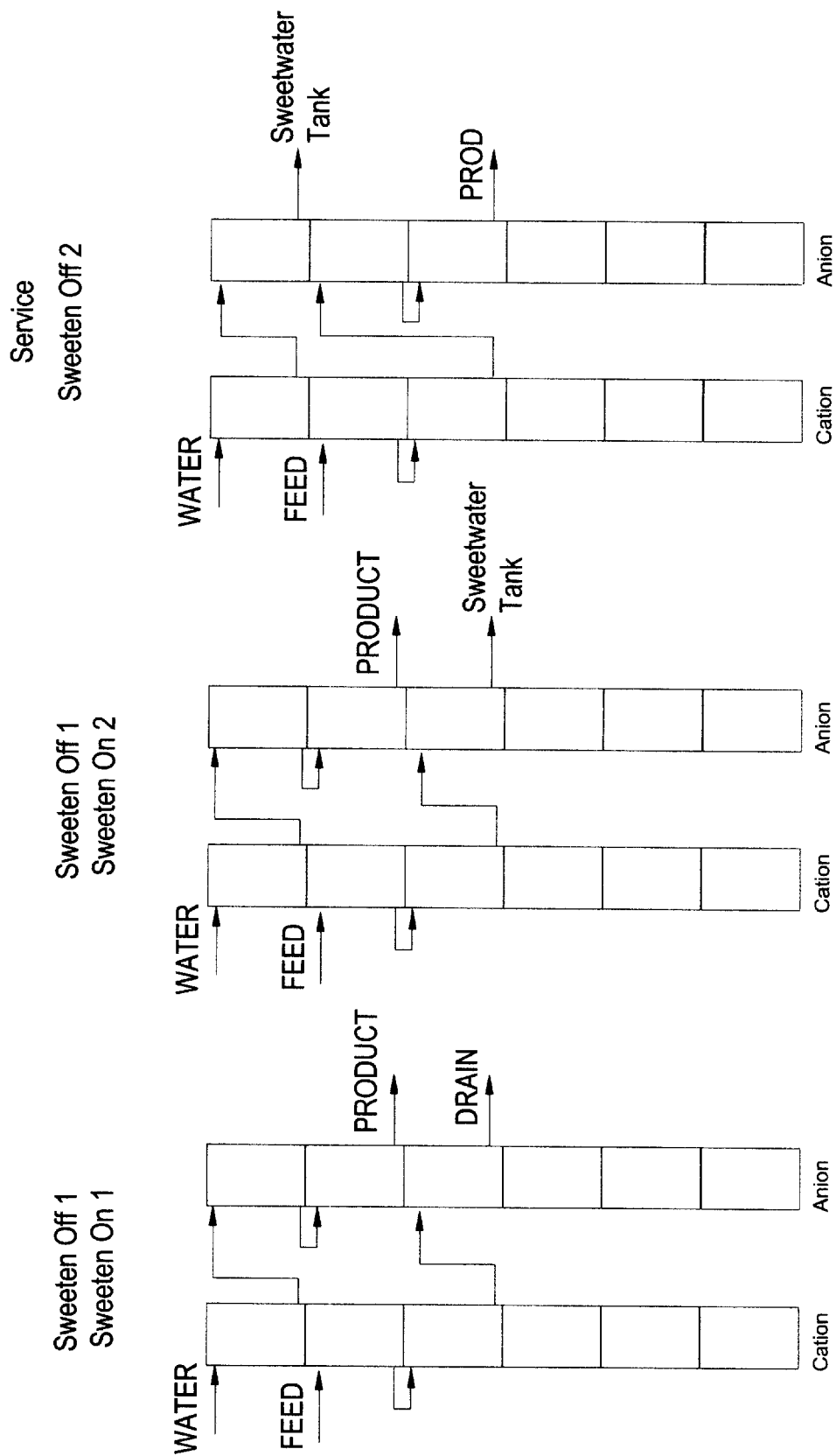
FIG. 7 is a diagram of a single pass, dual vessel cation and anion system, illustrating sweeten-on and sweeten-off steps.

Referring now to FIG. 7, the sweeten-off and sweeten-on flow paths undertaken during a zone advance are shown for a single pass system.

Figure 8:
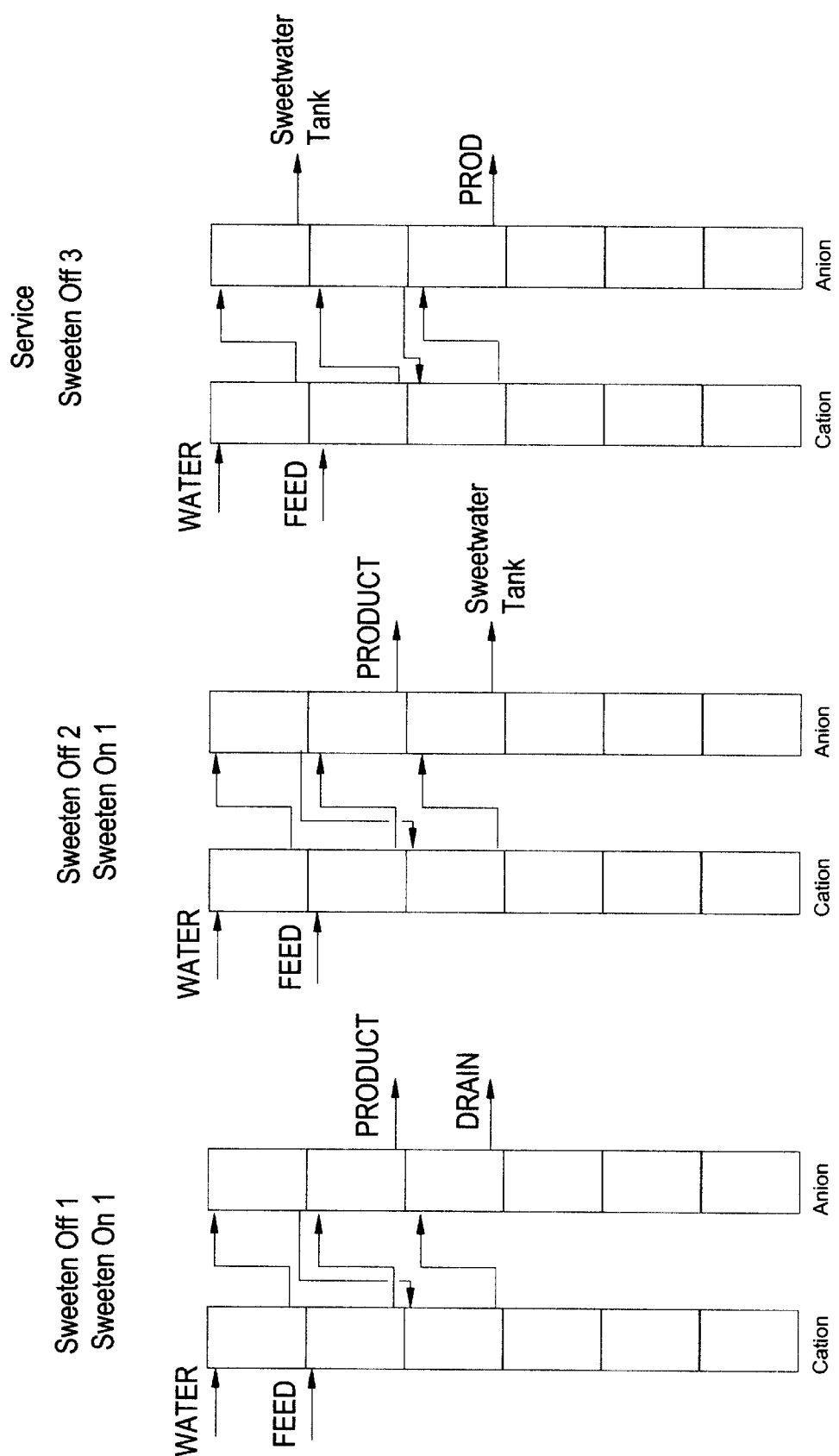
FIG. 8 is a diagram of a dual pass, dual vessel cation and anion system, illustrating sweeten-on and sweeten-off steps.

FIG. 8 shows the sweeten-off and sweeten-on flow paths for a dual pass system. Both of these schemes allow for continuous feed and product streams during the sweeten on and sweeten off steps.

FIG. 11 illustrates the valves, which are open during each of the steps of a dual pass embodiment of the current invention, utilizing recirculation rinse.

Referring now to FIG. 5, the first ion exchange zone advance occurs after exhausted resin has been just sweetened-off from primary service. The exhausted resin is exposed cocurrently to spent chemical regenerant from the preceding ion exchange zone (1) followed by a rinse (2) step. The resin then remains in stand-by (3, 4, and 5) until the next ion exchange zone advance. In the second ion exchange zone advance, the resin is exposed to fresh chemical regenerant (6). The dilution water for the fresh concentrated chemical regenerant is supplied by the rinse exiting the previous ion exchange zone. The concentration of the fresh concentrated regenerate is such that when diluted, it enters the ion exchange zone at about 4% to 7% concentration. After the regenerant has been introduced to the ion exchange zone, the flow of concentrated chemical is shut off and the rinse from the previous ion exchange zone is continued (7). Again, the resin remains in stand-by (8, 9, and 10) until the next ion exchange zone advance. In the third ion exchange zone advance, two rinse steps (11 and 12) take place. This may be followed by an optional backwash of about 5 to 10 minutes in duration (13). The resin then remains in a stand-by condition (14) and (15) until the next ion exchange zone advance. In the fourth ion exchange zone advance, two additional rinse steps (16 and 17) take place followed by a stand-by step (18). If the resin is not sufficiently rinsed in the dual vessel mode, utilizing a cation vessel and an anion vessel, a recirculation rinse step (19) can be initiated, followed by an optional stand-by step (20). In the fifth ion exchange zone advance, the resin is in secondary service (21–25) and in the sixth ion exchange zone advance, the resin is in primary service (26–30), until it is exhausted and returns to the spent chemical step (1). A second vessel, not shown, would be undergoing identical steps with the opposite ion exchange resin.

Again referring to FIG. 5, another way to envision the process is to evaluate what an entire vessel is doing during each stage of regeneration and service. In the Service/Rinse/Regeneration stage (5-A), two ion exchange zones are in primary and secondary service. Two additional ion exchange zones are in series rinse and the final two ion exchange zones are in series regeneration. The rinse water from the series rinse is used to dilute the concentrated regenerant chemical for series regeneration. In the Service/Rinse stage (5-B), two ion exchange zones are in primary and secondary service. The remaining four ion exchange zones are in series rinse. In the Service/Backwash stage (5-C), two ion exchange zones are in primary and secondary service. The ion exchange zone after the secondary service ion exchange zone (18) is in standby, while the following ion exchange zone (13) is in an optional backwash mode of between about 5 minutes and about 15 minutes in duration. The remaining two ion exchange zones are in standby. In the Service/Recirculation Rinse stage (5-D), two ion exchange zones are in primary and secondary service. The ion exchange zone below the secondary service ion exchange zone, which will become the secondary service ion exchange zone with the next ion exchange zone advance, is in a recirculation rinse mode. The remaining three ion exchange zones are in stand-by. In the Service stage (5-E), two ion exchange zones are in primary and secondary service while the remaining four ion exchange zones are in stand-by.

An ion exchange zone advance time is dependent on service throughput. An advance occurs when the primary resin beds are exhausted. Regeneration flows for all zones undergoing regeneration are adjusted so that any particular regeneration step is complete when a zone advance occurs that would move that particular zone to the next regeneration step. An advance may be initiated by product conductivity, pH, throughput, or other analytical means. A programmable logic controller (PLC) control means may be programmed such that as the resin ages or the feed ionic content increases and the service runs become shorter, the regeneration flows increase incrementally to assure that the zone advances do not occur before the regeneration steps are completed. Such a control means would also be similarly programmed to decrease the regeneration flows to allow for decreases in feed ionic content, which would lengthen service run time. The flexibility in the invention allows for variations in the regenerant flow rates. For a continuous regenerant waste stream, regenerant flow rates are reduced in order to eliminate the stand-by steps. If a user requires cross regeneration for resin cleanup purposes, backwash to remove broken resin particles or silt, or recirculation steps to further rinse the resin, regeneration flow rates are adjusted so that these steps may be added to the regeneration sequence.

Regeneration sequences are completed in four phases, each phase representing a different ion exchange zone advance in the invention design. Typically, four ion exchange zones are regenerated in series while the other two ion exchange zones are in a service mode. For the cation resin, a chemical dosage reduction of at least 14% was realized compared to a conventional ion-exchange dosage of 3.5 lbs 100% HCl/ft$^3$. Anion resin chemical dosage was reduced at least 37% compared to a conventional ion-exchange design of 4 lbs 100% NaOH/ft$^3$. It is probable that these dosages can be reduced further with more detailed optimization studies. The reduced chemical dosages did not affect product quality or service throughput. The method of the present invention is also capable of operating with other common regenerant chemicals well known in the art.

Regeneration studies also showed that the rinse sequence inherent to the present invention design was sufficient to adequately rinse the cation and anion resins. The invention design allows for one rinse volume, a backwash and a final rinse volume following chemical elution. Water reuse through each ion-exchange zone during regeneration allowed for overall lower water volumes without affecting endpoint rinse qualities of the resins as compared to conventional ion-exchange design. Also inherent with the present invention design is the backwash step placed after chemical elution. This placement of backwash allows for lower backwash flow rates over conventional ion-exchange design due to the resin bed's expanded regenerated volume. This was most notable in the case of the anion resin, which swells approximately 20% upon regeneration from the exhausted form to its NaOH form. Due to water reuse and backwash flow rate reduction in the present invention design as compared to conventional ion-exchange design, a 48% reduction in water volume was achieved.

Another aspect of the regeneration phase in the present invention is the substantially lower rinse flow rates as compared to conventional ion-exchange design. Typical ion-exchange design rinse flow rates are in the order of 1–4 gpm/ft$^3$. In the case of the present invention, regeneration rinse flow rates are typically 0.07 to 0.25 gpm/ft$^3$. Experimental results showed lower rinse flow rates inherent to the present invention did not affect final rinse quality of the resin or product quality in subsequent service cycles.

The flow sequences for sweeten-on and sweeten-off in single pass and dual pass modes can be found in FIGS. 7 and 8. The three remaining ion exchange zones are in stand-by. Sweetening on and off steps occur at the end of an ion exchange zone advance time. Operating the system in this manner provides for continuous flow of product. Sweetwater waste to evaporation is eliminated in the present invention by backblending it to the feed stream. Based on typical sweetwater volumes at a 6 gpm/ft$^2$ flow rate, approximately 10–12% of the feed volume is made up of sweetwater. This volume would reduce the feed dry solids content by 2–3%.

Pressure drop studies were completed at linear velocities of 2 gpm/ft$^2$ (typical of conventional six-bed ion exchange) to 8 gpm/ft$^2$ using 30% dry solids dextrose feed at 110° F. Results of these studies are presented in FIG. 15. The pressure drop differential was 0.4 pounds per square inch (psi) per foot of ion exchange resin with both cation and anion resins at a linear velocity of 2 gpm/ft$^2$. At a linear velocity of 6 gpm/ft$^2$, the pressure drop increased to 1.5 psi per foot of ion exchange resin and at a linear velocity of 8 gpm/ft$^2$, the pressure drop was 2.3 psi per foot of ion exchange resin. Because the present invention employs shallower bed depths of 3 ft versus convention ion-exchange design of up to 8–9 ft, a significantly higher linear flow rate can be utilized. Conventional ion-exchange design flow rate is controlled by pressure drop limitations whereas the present invention design flow rate is controlled by product quality limitations.

A product comparison summary can be found in FIG. 14. This table shows a comparison between conventional ion exchange methods and single pass and dual pass modes of the present invention. Experimental studies showed that both single and dual pass modes generated an effluent dextrose product comparable to typical product regarding color, heat color, organic acids, protein removal and hydroxymethylfurfural formation. However, during the single pass mode series, the conductivity of the product was significantly higher than the typical product. The conductivity of the typical product averaged 5.2 μmhos/cm while the average conductivity from the single pass mode effluent was 12.9 μmhos/cm. Running in a dual pass mode sequence reduced the conductivity to levels comparable to the typical product.

Results shown in FIG. 14, indicate that an acceptable dextrose product effluent will be achieved based on the invention design using a dual pass mode at a 6 gpm/ft$^2$ linear velocity (2 gpm/ft$^3$) and 110° F. temperature at the same pounds of dry solids per cubic foot throughput as a conventional ion exchange method.

Based upon these results, a 250 gpm dextrose purification system of the present invention would require a total ion exchange resin volume of approximately 2,200 cubic feet and the two vessels would occupy about 112 square feet of floor space. A conventional six-bed 250 gpm dextrose purification system requires approximately 6,300 cubic feet of ion exchange resin, with the six vessels occupying a total of about 936 square feet of floor space.

EXAMPLE 1
Single Column Operation With Backwash

The following example will illustrate single column operation, utilizing a vessel with six ion exchange zones. All of these ion exchange zones are filled with one type of ion exchange resin: either a cation exchange resin or an anion exchange resin. Referring now to FIG. 10, an ion exchange zone advance has just occurred, changing the feed inlet from ion exchange zone 1 to ion exchange zone 2. Step 1 shows the valve sequence for the service, rinse, and regeneration processes. Ion exchange zone 2 and 3 are in primary and secondary service respectively. Ion exchange zones 4 and 5 are in series rinse with the rinse effluent being combined with concentrated regenerant chemical and sent forward through ion exchange zones 6 and 1 in series. In step 2, ion exchange zones 2 and 3 remain in service, while ion exchange zones 4, 5, 6 and 1 are in series rinse. In step 3, ion exchange zones 2 and 3 remain in service, and ion exchange zone 5 is backwashed briefly. Ion exchange zones 4, 6, and 1 are in standby. In step 4, the resin in ion exchange zone 5 is allowed to settle. Ion exchange zones 2 and 3 remain in primary and secondary service and ion exchange zones 4, 5, 6, and 1 remain in standby until the next ion exchange zone advance.

EXAMPLE 2
Dual Pass Mode With Sweeten On/Off, Backwash, and Recirculating Rinse

The following example will illustrate a dual pass service dextrose deionization mode of the present invention, utilizing one vessel with six cation exchange zones and one vessel with six anion exchange zones. Referring now to FIG. 11, an ion exchange zone advance has just occurred. The ion exchange zones in both vessels advance simultaneously. Step 1 shows the valve sequence involved in sweetening off cation exchange zone 1 through anion exchange zone 1 forward into cation exchange zone 3 and anion exchange zone 3, both of which are being sweetened on for secondary service. At the same time, cation exchange zone 2 and anion exchange zone 2 continue to produce deionized product. In step 2, cation zone 1 and anion zone 1 continue to be sweetened off forward into cation zone 3 and anion zone 3, but the effluent from anion zone 3 is now collected in the sweetwater tank. Cation zone 2 and anion zone 2 continue to produce deionized product. At the end of this step cation zone 3 and anion zone 3 are sweetened on. In step 3, feed passes through cation zone 2 and anion zone 2, which are in primary service, and in series through cation zone 3 and anion zone 3, which are in secondary service. At the same time there is a brief flush of the cation headers, through anion zone 1 to the sweetwater tank. In step 4, cation zone 1 continues sweetening off through anion zone 1 to the sweetwater tank, while zones 2 and 3 remain in primary and secondary service. At the end of step 4, cation exchange zone 1 and anion exchange zone 1 are fully sweetened off. In step 5, the anion headers undergo a brief flush to the sweetwater tank, while zones 2 and 3 remain in primary and secondary service. An overall picture of this sweeten-on and sweeten-off process, excluding header flushes, can be visualized in FIG. 8. Referring again to FIG. 11, in step 6, ion exchange zones 2 and 3 remain in primary and secondary service. Both the cation and anion vessel begin their regeneration steps. The process is similar for both vessels, although the regenerant chemical and flow rates will vary. For each vessel, ion exchange zones 4 and 5 are in series water rinse, with the rinse effluent of ion exchange zone 5 being blended with fresh concentrated regenerant chemical and sent forward into ion exchange zone 6. Spent regenerant from ion exchange zone 6 begins to pass through ion exchange zone 1, carrying out a partial regeneration of this zone. In step 7, ion exchange zones 2 and 3 remain in primary and secondary service. For each vessel, zones 4, 5 and 6 continue a series rinse through ion exchange zone 1, which continues its partial regeneration with the waste regenerant from zone 6. During step 8, ion exchange zones 2 and 3 remain in primary and secondary service. In each vessel, ion exchange zone 5 undergoes a brief backwash. Step 9 is a very brief flush of the rinse/waste header to clear it of chemicals prior to recirculating rinse. Ion exchange zones 2 and 3 remain in primary and secondary service. Step 10 places cation exchange zone 4 and anion exchange zone 4 in recirculating rinse mode, while ion exchange zone 2 and 3 remain in primary and secondary service. An overall picture of the recirculation rinse process can be visualized in FIG. 6. In step 11, ion exchange zones 1, 4, 5 and 6 are in standby until ion exchange zone 2 exhausts. Ion exchange zones 2 and 3 remain in primary and secondary service until this event occurs, triggering the next ion exchange zone advance.

EXAMPLE 3
Single Pass Mode With Sweeten On/Off, Backwash, and Recirculating Rinse The following example will illustrate a single pass service dextrose deionization mode of the present invention, utilizing one vessel with six cation exchange zones and one vessel with six anion exchange zones. Referring now to FIG. 12, an ion exchange zone advance has just occurred, with both vessels advancing simultaneously. Step 1 shows the valve sequence involved in sweetening off cation exchange zone 1 forward into anion exchange zone 1, which is pushing product forward in series through anion ion exchange zone 2. At the same time, cation exchange zone 3 and anion exchange zone 3 are being sweetened on in preparation for secondary service with the effluent from cation exchange zone 2. In step 2, cation exchange zone 1 continues to be sweetened off forward into anion exchange zone 1, which continues to push product forward through anion ion exchange zone 2. At the same time, the cation product from cation ion exchange zone 2 continues to sweeten on cation exchange zone 3 and anion ion exchange zone 3 forward to the sweetwater tank. In step 3, cation exchange zones 2 and 3 and anion exchange zones 2 and 3 are fully sweetened on and deliver product forward. The feed passes through cation exchange zones 2 and 3 in series, then through anion exchange zones 2 and 3 in series. The cation headers are flushed briefly, with the spent water being used to sweeten off anion exchange zone 1. In step 4, cation exchange zone 1 and anion ion exchange zone 1 finish sweetening off forward to the sweetwater tank, while cation exchange zone 2 and 3 and anion exchange zones 2 and 3 remain in service. In step 5, the anion headers are flushed forward to the sweetwater tank, while cation exchange zone 2 and 3 and anion exchange zones 2 and 3 remain in service. An overall picture of this sweeten-on and sweeten-off process can be visualized in FIG. 7. The regeneration, rinse, backwash, and recirculation rinse steps in the sequence are identical to those in the dual pass mode of operation (Example 2).

EXAMPLE 4
Dual Pass Mode With Sweeten On/Off, Backwash, Recirculating Rinse, and Cross Regeneration of Cation In sugar applications, cation exchange resins commonly become fouled with proteinaceous materials and periodically require a cross regeneration with sodium hydroxide to remove these foulants. The present invention easily accommodates cross regeneration. One method is illustrated in FIG. 13. The only difference between this mode of operation and the dual pass example given in Example 2 is the addition of steps 6, 7, 8, and 9 which accomplish the cross regeneration of the cation resin and subsequent rinse and re-conversion with acid prior to a normal regeneration with acid. Steps 1–5 are identical for both FIG. 11 and FIG. 13. Steps 6–11 in FIG. 11 are equivalent to steps 10–15 in FIG. 13. After sweeten on/off, in step 6, sodium hydroxide from the inlet of anion exchange zone 6 is transferred via the recirculation rinse lines through cation exchange zone 6 to drain. Step 7 is a very brief flush of the rinse/waste header. Step 8 is a rinse of cation exchange zone 6 using the same flow path as step 6. Step 9 is the partial regeneration of cation exchange zone 6. Normal regeneration for both the anion vessel and cation vessel resumes in step 10. The used regenerant from cation exchange zone 6 strips calcium and magnesium from the resin in cation exchange zone 1 to prevent precipitation during the cross regeneration in the subsequent exchange zone advance. Ion exchange zones 2 and 3 remain in primary and secondary service throughout the cross regeneration.

Although the above examples relate primarily to deionization of sugar solutions, it should be understood that the present invention may be used in any application involving the exchange of ions in a liquid environment. Although specific features of the invention are shown in some drawings and not in others, it is for convenience only and each feature may be combined with any or all of the other features in accordance with the invention. It should be understood that the foregoing description of the invention is intended merely to be illustrative by way of example only and that other modifications, embodiments and equivalents may be apparent to those skilled in the art without departing from its spirit. It will be understood to those of ordinary skill in the art that other configurations may be substituted or added consistent with this invention.

Having thus described our invention, what we desire to claim and secure by Letters Patent is:

1. A process for the continuous purification of a liquid comprising the steps of:
   (a) providing at least six ion exchange zones; each of the ion exchange zones containing ion exchange resin; each of the ion exchange zones having an inlet and an outlet with the inlet able to communicate with the outlet of the preceding ion exchange zone and the outlet able to communicate with the inlet of the succeeding ion exchange zone; the outlet of the last ion exchange zone able to communicate with the inlet of the first ion exchange zone;
   (b) providing a valving means whereby each ion exchange zone inlet may communicate to either a feed stream, a regenerant stream, a water stream, or a sweetwater stream;
   (c) providing a valving means whereby each ion exchange zone outlet may communicate to either a product stream, a waste stream, or a sweetwater stream;
   (d) providing a valving means whereby communication between any ion exchange zone outlet and the next succeeding ion exchange zone inlet may be interrupted;
   (e) passing a feed stream in series downwardly through a first and second of the ion exchange zones and collecting a product from the second ion exchange zone; passing the water stream in series downwardly through a third and fourth of the ion exchange zones; combining the rinse stream exiting the fourth ion exchange zone with the regenerant stream and passing the combined streams into a fifth ion exchange zone, in series downwardly through a sixth ion exchange zone to the waste stream;
   (f) passing a feed stream in series downwardly through the first and second of the ion exchange zones and collecting a product stream from the second ion exchange zone; passing the water stream in series downwardly through the third, fourth, fifth and sixth of the ion exchange zones to the waste stream;
   (g) repeating steps (e) and (f) by periodically advancing all streams entering and exiting an ion exchange zone to the next succeeding ion exchange zone, the first ion exchange zone succeeding the last ion exchange zone.

2. The process as set forth in claim 1 wherein the ion exchange zones are contained within a single pressure vessel, the pressure vessel being physically separated into discrete compartments, each of the compartments having an inlet and an outlet, each of the compartments comprising an ion exchange zone.

3. The process as set forth in claim 1 wherein each of the ion exchange zones is contained within separate pressure vessels.

4. The process as set forth in claim 1 including providing a backwashing step after the introduction of a water rinse stream into any of the ion exchange zones wherein water is introduced to the outlet of the ion exchange zone, passed upwardly through the ion exchange resin, and exits through the inlet of the ion exchange zone to the waste stream.

5. The process as set forth in claim 1 including providing a step for collecting sweetwater from an ion exchange zone.

6. A process for the continuous purification of a liquid comprising the steps of:
   (a) providing at least six cation ion exchange zones; each of the cation ion exchange zones containing cation ion exchange resin; each of the cation ion exchange zones having an inlet and an outlet with the inlet able to communicate with the outlet of the preceding cation ion exchange zone and the outlet able to communicate with the inlet of the succeeding cation ion exchange zone; the outlet of the last cation ion exchange zone able to communicate with the inlet of the first cation ion exchange zone;
   (b) providing a valving means whereby each cation ion exchange zone inlet may communicate to either a primary feed stream, a regenerant stream, a water stream, an anion recirculation rinse stream, or a sweetwater stream;
   (c) providing a valving means whereby each cation ion exchange zone outlet may communicate to either a primary product stream, a waste stream, an anion recirculation rinse stream, or a sweetwater stream;
   (d) providing a valving means whereby communication between any cation ion exchange zone outlet and the next succeeding cation ion exchange zone inlet may be interrupted;
   (e) providing at least six anion ion exchange zones; each of the anion ion exchange zones containing anion ion exchange resin; each of the anion ion exchange zones having an inlet and an outlet with the inlet able to communicate with the outlet of the preceding anion ion exchange zone and the outlet able to communicate with the inlet of the succeeding anion ion exchange zone; the outlet of the last anion ion exchange zone able to communicate with the inlet of the first anion ion exchange zone;

(f) providing a valving means whereby each anion ion exchange zone inlet may communicate to either a primary feed stream, a regenerant stream, a water stream, an cation recirculation rinse stream, or a sweetwater stream;

(g) providing a valving means whereby each anion ion exchange zone outlet may communicate to either a primary product stream, a waste stream, an cation recirculation rinse stream, or a sweetwater stream;

(h) providing a valving means whereby communication between any anion ion exchange zone outlet and the next succeeding anion ion exchange zone inlet may be interrupted;

(i) passing a primary feed stream in series downwardly through a first and second cation ion exchange zone and collecting a cation primary product stream from the second cation ion exchange zone; passing the water stream in series downwardly through a third and fourth cation ion exchange zone and combining the rinse stream exiting the fourth cation ion exchange zone with the cation regenerant stream and passing the combined streams into a fifth cation ion exchange zone, in series downwardly through a sixth cation ion exchange zone and to the waste stream; passing the cation primary product stream in series downwardly through a first and second anion ion exchange zone and collecting the anion primary product from the second anion ion exchange zone; passing the water stream in series downwardly through a third and fourth of the anion ion exchange zones and combining the rinse stream exiting the fourth anion ion exchange zone with the anion regenerant stream and passing the combined streams into a fifth anion ion exchange zone, in series downwardly through a sixth anion ion exchange zone and to the waste stream;

(j) passing the primary feed stream in series downwardly through the first and second of the cation ion exchange zones and collecting a cation primary product stream from the second cation ion exchange zone; passing the water stream in series downwardly through the third, fourth, fifth and sixth of the cation ion exchange zones and collecting a waste stream from the sixth cation ion exchange zone; passing the cation product stream in series downwardly through the first and second of the anion ion exchange zones and collecting an anion primary product stream from the second anion ion exchange zone; passing the water stream in series downwardly through the third, fourth, fifth and sixth of the anion ion exchange zones and collecting a waste stream from the sixth anion ion exchange zone;

(k) repeating steps (i) and (j) by periodically advancing all streams entering and exiting an ion exchange zone to the next succeeding ion exchange zone, the first ion exchange zone succeeding the last ion exchange zone.

7. The process as set forth in claim 6 wherein the cation exchange zones are contained within one pressure vessel, and the anion exchange zones are contained within another pressure vessel each of the pressure vessels being physically separated into discrete compartments, each of the compartments having an inlet distributor and an outlet distributor, each of the compartments comprising an ion exchange zone.

8. The process as set forth in claim 6 wherein the cation exchange zones and the anion exchange zones are contained within one pressure vessel, the pressure vessels being physically separated into discrete compartments, each of the compartments having an inlet and an outlet, each of the compartments comprising an ion exchange zone.

9. The process as set forth in claim 6 wherein each of the ion exchange zones are contained within separate pressure vessels.

10. The process as set forth in claim 6 including providing a backwashing step after the introduction of a water rinse into any of the ion exchange zones wherein water is introduced to the outlet of the ion exchange zone, passed upwardly through the ion exchange resin, and exits through the inlet of the ion exchange zone to the waste stream.

11. The process as set forth in claim 6 including providing a step for collecting sweetwater from an ion exchange zone.

12. The process as set forth in claim 6 including including providing a pumping means and a step whereby rinse water may be recirculated from an anion ion exchange zone through a cation ion exchange zone and back through the anion exchange zone.

13. The process as set forth in claim 6 including providing a step for passing the cation regenerant stream through an anion exchange zone and a step for passing the anion regenerant stream through a cation exchange zone.

14. A process for the continuous purification of a liquid comprising the steps of:

(a) providing at least six cation ion exchange zones; each of the cation ion exchange zones containing cation ion exchange resin; each of the cation ion exchange zones having an inlet and an outlet with the inlet able to communicate with the outlet of the preceding cation ion exchange zone and the outlet able to communicate with the inlet of the succeeding cation ion exchange zone; the outlet of the last cation ion exchange zone able to communicate with the inlet of the first cation ion exchange zone;

(b) providing a valving means whereby each cation ion exchange zone inlet may communicate to either a primary feed stream, a secondary feed stream, a regenerant stream, a water stream, an anion recirculation rinse stream, or a sweetwater stream;

(c) providing a valving means whereby each cation ion exchange zone outlet may communicate to either a primary product stream, a secondary product stream, a waste stream, an anion recirculation rinse stream, or a sweetwater stream;

(d) providing a valving means whereby communication between any cation ion exchange zone outlet and the next succeeding cation ion exchange zone inlet may be interrupted;

(e) providing at least six anion ion exchange zones; each of the anion ion exchange zones containing anion ion exchange resin; each of the anion ion exchange zones having an inlet and an outlet with the inlet able to communicate with the outlet of the preceding anion ion exchange zone and the outlet able to communicate with the inlet of the succeeding anion ion exchange zone; the outlet of the last anion ion exchange zone able to communicate with the inlet of the first anion ion exchange zone;

(f) providing a valving means whereby each anion ion exchange zone inlet may communicate to either a primary feed stream, a secondary feed stream, a regenerant stream, a water stream, a cation recirculation rinse stream, or a sweetwater stream;

(g) providing a valving means whereby each anion ion exchange zone outlet may communicate to either a primary product stream, a secondary product stream, a waste stream, a cation recirculation rinse stream, or a sweetwater stream;

(h) providing a valving means whereby communication between any anion ion exchange zone outlet and the next succeeding anion ion exchange zone inlet may be interrupted;

(i) passing the primary feed stream in series downwardly through a first cation ion exchange zone, a first anion ion exchange zone, a second cation ion exchange zone, a second anion ion exchange zone and collecting a secondary product stream from the second anion ion exchange zone; passing the water stream in series downwardly through a third and fourth cation ion exchange zone and combining the rinse stream exiting the fourth cation ion exchange zone with the cation regenerant stream and passing the combined streams into a fifth cation ion exchange zone, in series downwardly through a sixth cation ion exchange zone and to the waste stream; passing the water stream in series downwardly through a third and fourth of the anion ion exchange zones and combining the rinse stream exiting the fourth anion ion exchange zone with the anion regenerant stream and passing the combined streams into a fifth anion ion exchange zone, in series downwardly through a sixth anion ion exchange zone and to the waste stream;

(j) passing the primary feed stream in series downwardly through a first cation ion exchange zone, a first anion ion exchange zone, a second cation ion exchange zone, a second anion ion exchange zone and collecting a secondary product stream from the second anion ion exchange zone; passing the water stream in series downwardly through the third, fourth, fifth and sixth of the cation ion exchange zones and collecting a waste stream from the sixth cation ion exchange zone; passing the water stream in series downwardly through the third, fourth, fifth and sixth of the anion ion exchange zones and collecting a waste stream from the sixth anion ion exchange zone;

(k) repeating steps (i) and (j) by periodically advancing all streams entering and exiting an ion exchange zone to the next succeeding ion exchange zone, the first ion exchange zone succeeding the last ion exchange zone.

15. The process as set forth in claim 14 wherein the cation exchange zones are contained within one pressure vessel, and the anion exchange zones are contained within another pressure vessel each of the pressure vessels being physically separated into discrete compartments, each of the compartments having an inlet distributor and an outlet distributor, each of the compartments comprising an ion exchange zone.

16. The process as set forth in claim 14 wherein the cation exchange zones and the anion exchange zones are contained within one pressure vessel, the pressure vessels being physically separated into discrete compartments, each of the compartments having an inlet and an outlet, each of the compartments comprising an ion exchange zone.

17. The process as set forth in claim 14 wherein each of the ion exchange zones are contained within separate pressure vessels.

18. The process as set forth in claim 14 including providing a backwashing step after the introduction of a rinse into any of the ion exchange zones wherein water is introduced to the outlet of the ion exchange zone, passed upwardly through the ion exchange resin, and exits through the inlet of the ion exchange zone to the waste stream.

19. The process as set forth in claim 14 including providing a step for collecting sweetwater from an ion exchange zone.

20. The process as set forth in claim 14 including including providing a pumping means and a step whereby rinse water may be recirculated from an anion ion exchange zone through a cation ion exchange zone and back through the anion ion exchange zone.

21. The process as set forth in claim 14 including providing a step for passing the cation regenerant stream through an anion exchange zone and a step for passing the anion regenerant stream through a cation exchange zone.

* * * * *